United States Patent [19]
Oates et al.

[11] Patent Number: 5,928,420
[45] Date of Patent: Jul. 27, 1999

[54] CEMENT COMPOSITION FOR ALKALI-REACTIVE AGGREGATE AND FOR SULPHATE RESISTANCE

[75] Inventors: David Bridson Oates, Kettleby; Michael David Arthur Thomas, Toronto; Philip de Sousa Zacarias, Mississauga; Donald Stephen Hopkins, Thornhill; Kevin Moire Cail, Aurora, all of Canada

[73] Assignee: Lafarge Canada, Inc., Canada

[21] Appl. No.: 09/159,921

[22] Filed: Sep. 24, 1998

[51] Int. Cl.[6] .................................................. C04B 7/13
[52] U.S. Cl. .................... 106/705; 106/709; 106/737; 106/819; 106/DIG. 1
[58] Field of Search .................................... 106/705, 709, 106/737, 819, DIG. 1

[56] References Cited

U.S. PATENT DOCUMENTS

| | | | |
|---|---|---|---|
| 4,624,711 | 11/1986 | Styron | 106/DIG. 1 |
| 4,635,724 | 1/1987 | Bruckdorfer et al. | 106/709 |
| 4,715,896 | 12/1987 | Berry | 106/707 |
| 4,992,102 | 2/1991 | Barbour | 106/645 |
| 4,997,484 | 3/1991 | Gravitt et al. | 106/705 |
| 5,223,035 | 6/1993 | Hopkins et al. | 106/707 |
| 5,435,843 | 7/1995 | Roy et al. | 106/705 |
| 5,565,028 | 10/1996 | Roy et al. | 106/705 |
| 5,573,588 | 11/1996 | Carrasquillo | 106/705 |
| 5,578,122 | 11/1996 | Carrasquillo | 106/705 |

OTHER PUBLICATIONS

Chemical Abstract No. 108:136631, abstract of an article by Glasser et al entitled "Hydration reactions in cement pastes incorporating fly ash and other pozzolanic materials", Mater. Res. Soc. Symp. Proc. 85, 167–86, 1987, No Month.

Chemical Abstract No. 117:75170, abstract of an article by Bayasi entitled "Effects of fly ash on the properties of silica–fume concrete", Concr. Int. 14(4), 52–54, 1992, No Month.

Chemical Abstract No. 117:96211, abstract of an article by Novokshchenov entitled "Factors controlling the compressive strength of silica fune concrete in teh range 100–150 MPa", Mag. Concr. Res. 44(158), 53–61, 1992, No Month.

Chemical Abstract No. 121:262023, abstract of an article by Popovics entitled "Effects on the fineness of fly ash on the flow and compressive strength of portland cement mortars", Am. Concr. Inst., SP–141, 205–25, 1993, No Month.

Chemical Abstract No. 129:126035, abstract of an article by Misra et al entitled "ASR behavior of class C fly ash modified cement", Mater, New Millennium, Proc. Mater. Eng. Conf. 4th, vol. 1, 348–355, 1996, No Month.

*Primary Examiner*—Anthony Green
*Attorney, Agent, or Firm*—Bachman & LaPointe, P.C.

[57] ABSTRACT

A combination of a class C fly ash having a high analytical content of CaO, and a silica fume, with a hydraulic cement, such as Portland cement, produces concrete with alkali-silica reactive aggregate having acceptable low expansion such as by ASTM C 1260; and also produces sulphate resistance with mineral aggregates generally.

17 Claims, 3 Drawing Sheets

FIG_2

CEMENT COMPOSITION FOR ALKALI-REACTIVE AGGREGATE AND FOR SULPHATE RESISTANCE

BACKGROUND OF THE INVENTION

1. Field of the Invention

This invention relates to the use of a Class C fly ash in conjunction with silica fume in cement compositions, more especially cement compositions which are to be employed with alkali-reactive aggregates, and cement compositions which are to be employed in environments in which sulphate resistance is required.

2. Description of Prior Art

Mineral aggregate is employed in concrete, the binder for the concrete being Portland cement. It is known to replace a portion of the Portland cement with a pozzolan such as fly ash, which is the finely divided residue produced in the combustion of ground or powdered coal.

There are two principal classes of fly ash, namely Class F and Class C, and these are defined by ASTM C 618, which is incorporated herein by reference. Class F and Class C fly ash differ in the nature of the coal from which they are derived. Class F fly ash has a very low analytical content of lime (CaO), typically below 8%, by weight, whereas Class C fly ash typically has a high analytical content of lime, above 10%, by weight.

A particular problem arises with the use of certain classes of mineral aggregate in concrete. Some aggregates exhibit an alkali aggregate reaction (AAR), and especially an alkali-silica reaction (ASR), in which reactive silica in the aggregate reacts with alkalis in the Portland cement during hydration of the cement. The alkalis raise the pH of the interstitial water between particles of the cement, and this results in hydrolysis of the reactive silica with formation of an alkali silicate gel, based on sodium and potassium silicate. These silicates are very hygroscopic and increase in volume as water is absorbed from the interior of the concrete and ultimately from the exterior environment. If the internal pore volume of the concrete is insufficient to accommodate the extra volume of gel, excessive internal pressures, more especially tensile stress, are generated, leading to crack formation in the concrete. The formation of cracks permits ingress of water, carbon dioxide and chlorides, which further accelerate deterioration of the concrete.

Previously it has been found that Class F fly ash, ground granulated blast furnace slag, silica fume and calcined clays such as metakaolin are able to reduce alkali silica reaction in concrete. The siliceous component of these materials reacts with the calcium hydroxide produced in the hydration of Portland cement, to form additional calcium silicate hydrate which is the primary strength forming product of cement hydration. This additional calcium silicate hydrate has a low $CaO/SiO_2$ ratio and a higher capacity to bind alkalis thereby preventing the attack on aggregates; the pH of the interstitial water also decreases.

Concretes exposed to ground water containing sulphates exhibit deterioration as a result of reaction between the sulphate and hydrated compounds of the hardened cement, especially calcium aluminate hydrate, with formation of calcium sulphoaluminate (ettringite). Crystallization growth occurs with the formation of the calcium sulphoaluminate, resulting in expansion forces within the concrete which can result in cracking and disintegration.

SUMMARY OF THE INVENTION

It is an object of the invention to provide a cement composition and a cementitious composition which have particular utility in concrete formation with alkali-reactive aggregate.

It is a further object of this invention to provide a cement composition and cementitious composition providing sulphate resistance in concrete.

It is a further object of this invention to provide a solidifiable concrete formulation of a cementitious composition of the invention, and an alkali-reactive aggregate.

It is a further object of this invention to provide a solidified concrete based on a cementitious composition of the invention, and an alkali-reactive aggregate.

It is still another object of the invention to provide a method of inhibiting expansion of a concrete derived from alkali-reactive aggregate.

It is yet another object of the invention to provide a method of increasing sulphate resistance of a concrete which is to be exposed to a sulphate-containing environment.

In accordance with one aspect of the invention there is provided a cement composition for use with alkali-silica reactive aggregate to produce a concrete exhibiting acceptable low expansion or for increasing sulphate resistance of a concrete, comprising: in weight %, to a total of 100%: i) 45 to 87% of hydraulic cement; ii) 10 to 45% of a Class C fly ash having a calcium oxide analytical content greater than 15%, by weight, of said fly ash, and iii) 3 to 10% of silica fume.

In accordance with another aspect of the invention there is provided a solidifiable concrete formulation comprising an alkali-reactive aggregate, a cement composition of the invention and water, the concrete formulation, in a solidified state, exhibiting low expansion.

In accordance with still another aspect of the invention there is provided a solidified concrete derived from the solidifiable concrete formulation of the invention, in which the aggregate is bound in a solid mass with a solidified binder derived from a cement binder comprising water and the cement composition of the invention.

In accordance with yet another aspect of the invention there is provided a method of inhibiting expansion of a concrete derived from alkali-reactive aggregate which comprises binding the alkali-reactive aggregate in a solidifiable mass with a binder comprising a cement composition of the invention and water.

In still another aspect of the invention there is provided in a concrete formation comprising a mineral aggregate bound in a solid mass with solidified binder, the concrete formation being disposed in an environment in which it is exposed to attack by sulphates, the improvement wherein the binder is derived from a cement binder comprising water and a cement composition of the invention.

DETAILED DESCRIPTION OF THE INVENTION

A) Cement Composition

The cement composition of the invention is useful in two distinct areas.

First it may be used with alkali-reactive aggregate to produce a concrete exhibiting acceptable low expansion, which in general means that the resulting concrete should exhibit an expansion, by ASTM C 1260, of less than 0.1% at 14 days or by CSA A23.2-14A of less than 0.4% at 2 years.

Secondly it may be used with mineral aggregate generally to produce a concrete resistant to attack by sulphate, and which may thus be employed in a sulphate-containing environment in which the concrete is exposed to attack by the sulphate. Typical sulphate-containing environments are ground water and soil containing sulphate. In general, the concrete should exhibit a sulphate resistance by ASTM C 1012, of less than 0.1% at 1 year.

The cement composition of the invention comprises, in weight %, to a total of 100%:

i) 45 to 87%, preferably 58 to 82 and more preferably 69 to 76% of a hydraulic cement;

ii) 10 to 45%, preferably 15 to 35%, and more preferably 20 to 25% of a Class C fly ash having a calcium oxide analytical content greater than 15%, and preferably greater than 20%, by weight, of the fly ash, and iii) 3 to 10%, preferably 3 to 7% and more preferably 4 to 6% of silica fume.

a) Hydraulic Cement

The hydraulic cement is, in particular a particulate, inorganic hydraulic cement, and more especially Portland cement which sets and hardens by reaction with water. Portland cement comprises hydraulic calcium silicates and calcium sulphate.

b) Class C Fly Ash

Class C fly ash is defined by ASTM C 618 and in addition to pozzolanic properties has some cementitious properties. The Class C fly ash employed in the invention has an analytical content of CaO greater than 15%, by weight, and preferably greater than 20%, by weight. An analytical content of CaO refers to the total content of Ca expressed as the oxide CaO, the analytical content of CaO may include free lime, i.e., free CaO and CaO present in a chemical combined state, for example, in calcium silicates and calcium aluminates, crystalline melilite ($Ca_2Al_2SiO_8$) and merwinite ($Ca_3MgSi_2O_7$). The free lime content of Class C fly ash is typically less than 3%, by weight, of the analytical content.

c) Silica Fume

Silica fume is a by product in the production of silicon or ferro-silicon alloys and is collected by filtration of gases escaping the electric-arc furnace. Typically it has a silicon dioxide content of at least 75%, by weight, and consists of fine, spherical particles having an average diameter of about 0.1 $\mu$m.

B) Cementitious, Solidifiable and Solidified Compositions i) Cementitious Compositions The cement composition of the invention forms a cementitious composition with water.

Suitably the weight ratio of water to cement composition is 0.3 to 0.6, preferably 0.4 to 0.5:1, more preferably about 0.45:1.

Conventional additives may be added to the cementitious composition for use in concretes, for example, water reducers, retarders, accelerators and air entraining agents conforming to ASTM C 494; ASTM C 1017 and ASTM C 260, all incorporated herein by reference. These conventional additives are used in normal and high performance concretes to reduce water content and permeability.

Air entraining agents by entraining microscopic air voids, provide space for gel formed in the alkali-silica reaction when alkali-reactive aggregates are employed with the cementitious composition to produce concretes. In this way pressure within the concrete is relieved, which pressure would normally cause tensile failure to the concrete.

Conventional additives such as air entraining agents will reduce expansion caused by alkali-silica reaction, but their addition alone is not sufficient to prevent deleterious or excessive expansion.

ii) Mineral Aggregate

The cementitious composition of the invention when mixed with a mineral aggregate forms a solidifiable composition in which the cementitious composition forms a binder matrix for the aggregates. When the aggregate includes both coarse and fine aggregate, the solidifiable composition is classed as a concrete.

The proportions of coarse and fine aggregate used in such a concrete depends on the required properties and intended use.

Aggregates for use in concrete are described in ASTM C 33-90 "Standard Specification for Concrete Aggregates" which is incorporated herein by reference.

In general coarse aggregates fall within the range of 2 inches to ⅔ inch mesh; and fine aggregate falls in the range of No. 4 mesh to No. 200 mesh of ASTM C-11.

Typical coarse aggregates include gravel and crushed limestone; fine aggregates include sand.

Solidified concretes of the invention will typically have a content of the cement composition of the invention of 250–500 kg/m$^3$.

iii) Alkali-Silica Reactive Aggregates

In one aspect the invention is concerned with a cement composition and a cementitious composition for use with alkali-reactive aggregate. There are two broad classes of alkali-reactive aggregate, namely, alkali-silica reactive aggregate and alkali-carbonate reactive aggregate.

This latter aspect of the invention is more especially concerned with alkali-silica reactive aggregate.

Use of alkali-silica reactive aggregates in concretes is limited, in that such concretes exhibit cracking, as a result of detrimental expansion, with time. This cracking is generally slow in formation, but severe cracking may occur within a few years. Thus, with time, alkali-silica reactive aggregate can cause significant expansion, severe cracking and differential movements in concrete components.

In general alkali-silica reactive aggregates include as a first class, poorly crystalline or metastable silica minerals and volcanic or artificial glasses such as opal; tridymite; cristobalite; acid, intermediate and basic volcanic glasses; artificial glasses and beekite. Mineral aggregates containing as little as 1%, by weight, of an alkali-silica reactive aggregate of this first class may cause serious deterioration in concrete.

A second class of alkali-silica reactive aggregates comprises different varieties of quartz including chalcedony; crypocrystalline to microcrystalline and macrogranular quartz with deformed crystal lattice, rich in inclusions, intensively fractured or granulated; poorly crystalline quartz at grain boundaries and quartz cement overgrowths. Mineral aggregates containing as little as 5%, by weight, of an alkali-silica reactive aggregate of this second class may cause serious deterioration in concrete.

A further description of alkali-reactive aggregates including alkali-silica reactive aggregates is found in CSA A23, 1-94 Concrete Materials and Methods of Concrete Construction, Methods of Test for Concrete, Concrete, Appendix B, Alkali-Aggregate Reaction ISSN 0317-5669, published June 1994 by Canadian Standards Association; and in AC1 Manual of Concrete Practice 1996, Part 1, Materials and General Properties of Concrete, the teachings of which are incorporated herein by reference.

As indicated above the alkali-silica reaction with Portland Cement is associated with the formation of expansive alkali-silica gel in the concrete. Various tests are available for determining if a mineral aggregate is alkali-silica reactive, and these tests are employed to screen aggregates for their potential reactivity.

In particular the following standard tests, incorporated herein by references, are available and are employed for evaluating potential alkali-silica reactivity of a mineral aggregate: ASTM Test Method C 295, Petrographic Examination of Aggregates for Concrete; CSA Test Method A23.2-25A, Detection of Alkali-Silica Reactive Aggregate by Accelerated Expansion of Mortar Bars; and CSA Test Method A 23.2-14A, Potential Expansivity of Aggregates (Procedure for Length Change due to Alkali-Aggregate Reaction in Concrete Prisms); and ASTM C-1260 Standard Test Method for Potential Alkali Reactivity of Aggregates (Mortar-Bar Method).

Other standard tests, incorporated herein by reference, include ASTM C 227 Mortar-Bar Test for Potential Reactivity.

Other test methods, incorporated herein by reference, which have been used in the past but which are not generally recommended owing to different deficiencies include ASTM C 289 Potential Reactivity of Aggregates (Chemical Method) and ASTM C 227, Potential Alkali Reactivity of Cement-Aggregate Combinations (Mortar-Bar Expansion Test).

The afore-mentioned tests are published by ASTM and CSA and are incorporated herein by reference and are described in the afore-mentioned A23, 1-94 Appendix B, Alkali-Aggregate Reaction publication, incorporated herein by reference.

In general the aspect of the invention involving alkali-silica reactive aggregates, is concerned with aggregates classified as alkali-silica reactive by at least one of ASTM C 295, CSA A 23.2-14A, ASTM C 1260 and ASTM C 227, and preferably classified as alkali-silica reactive by two, three or four of these tests.

It is found that the cement composition of the invention produces with alkali-silica reactive aggregate, a concrete which exhibits low expansion and in particular an expansion by ASTM C 1260 of less than 0.1% at 14 days.

iv) Sulphate Resistance

In another aspect the invention is concerned with a cement composition and a cementitious composition for use in increasing sulphate resistance of a concrete, especially in a concrete which is to be exposed to a sulphate-containing environment, for example, sulphate-containing ground water, soil or industrial waste.

In this aspect of the invention, mineral aggregate generally can be employed in the concrete, and the mineral aggregate is not confined to alkali-reactive aggregate.

Sulphate attack in concretes is discussed in CSA A23.1 Concrete Materials and Methods of Concrete Construction, June 1994, pages 52 and 53, incorporated herein by reference. The standard test for sulphate attack on concrete is ASTM C 1012 Standard Test Method for Length Change of Hydraulic-Cement Mortars Exposed to a Sulfate Solution, which method is incorporated herein by reference.

It is found that the cement composition of the invention produces with mineral aggregate, a concrete which exhibits a resistance to sulphate by ASTM C 1012 of less than 0.1%, after 12 months.

EXAMPLES

Example 1

Cement compositions of the invention and a control were formulated with Portland cement and different proportions of silica fume and a Class C fly ash having an analytical CaO content of 24.6%, by weight, and obtained from the Edgewater boiler in Sheboygan, Wis., U.S.A., and were mixed with a siliceous limestone alkali-silica reactive aggregate available under the name Spratt, in accordance with the test procedure of ASTM C-1260- 94, incorporated herein by reference, and subjected to a 14 day % expansion test of ASTM C 1260.

Figure 1:
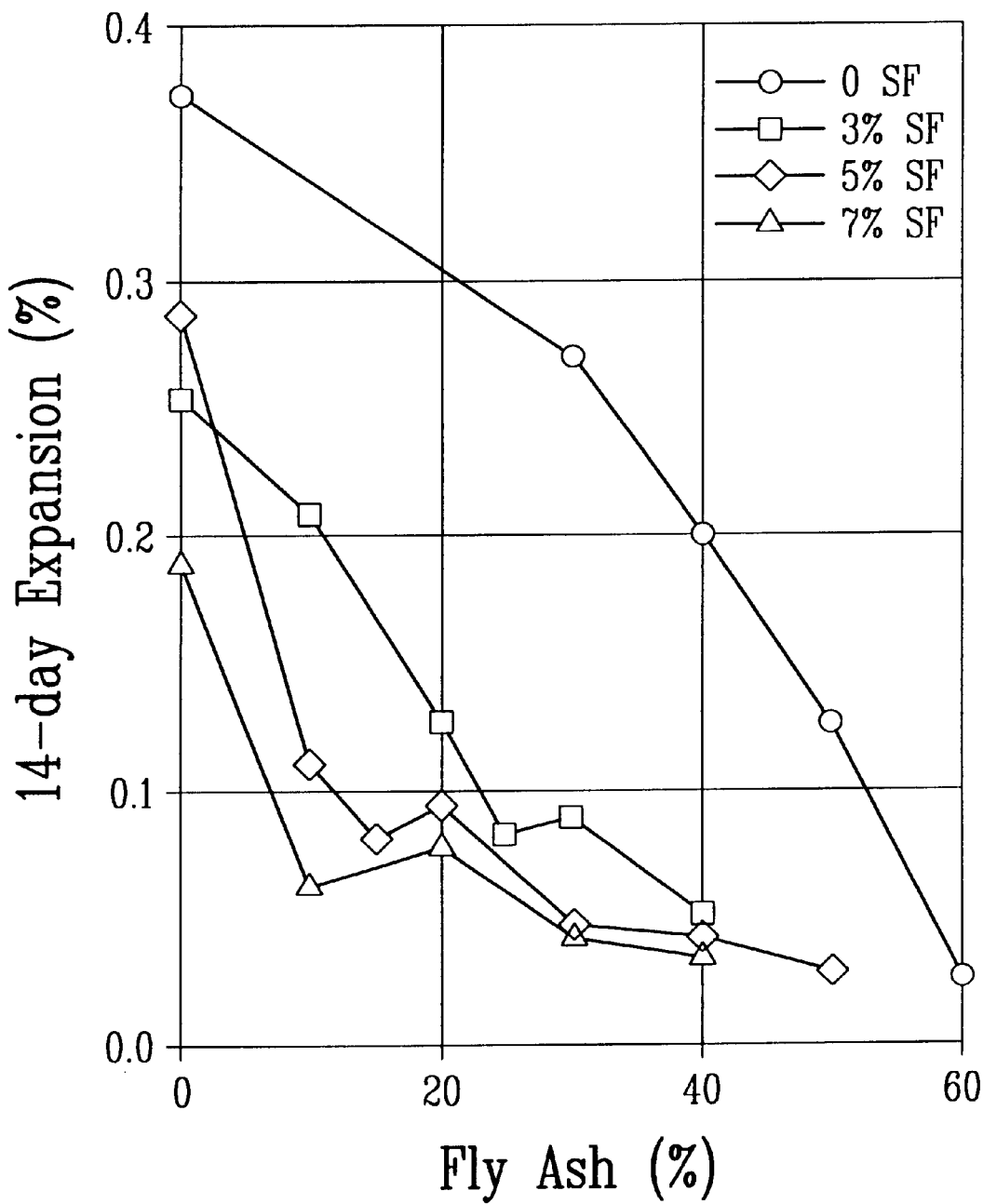
FIG. 1 is a plot showing expansion of mortar containing alkali-silica reactive aggregates with different cement compositions, containing a first Class C fly ash.

The results are shown graphically in FIG. 1. It can be seen from FIG. 1 that in the absence of silica fume, more than 50%, by weight, of the fly ash was required to achieve a 14 day expansion below 0.1%, whereas with a 3% content of silica fume, less than 25%, by weight, of the fly ash was required to achieve a 14 day expansion below 0.1%.

Increasing the silica fume content to 5%, permitted reduction of the fly ash content to as little as about 15%, while achieving a 14 day expansion below 0.1%; and a 7% content of silica fume permitted reduction of the fly ash content to as little as 10%, while achieving a 14 day expansion below 0.1%. The Portland Cement was present as the balance of the compositions to a total of 100%, based on the weight of Portland Cement, fly ash and silica fume.

Example 2

Figure 2:
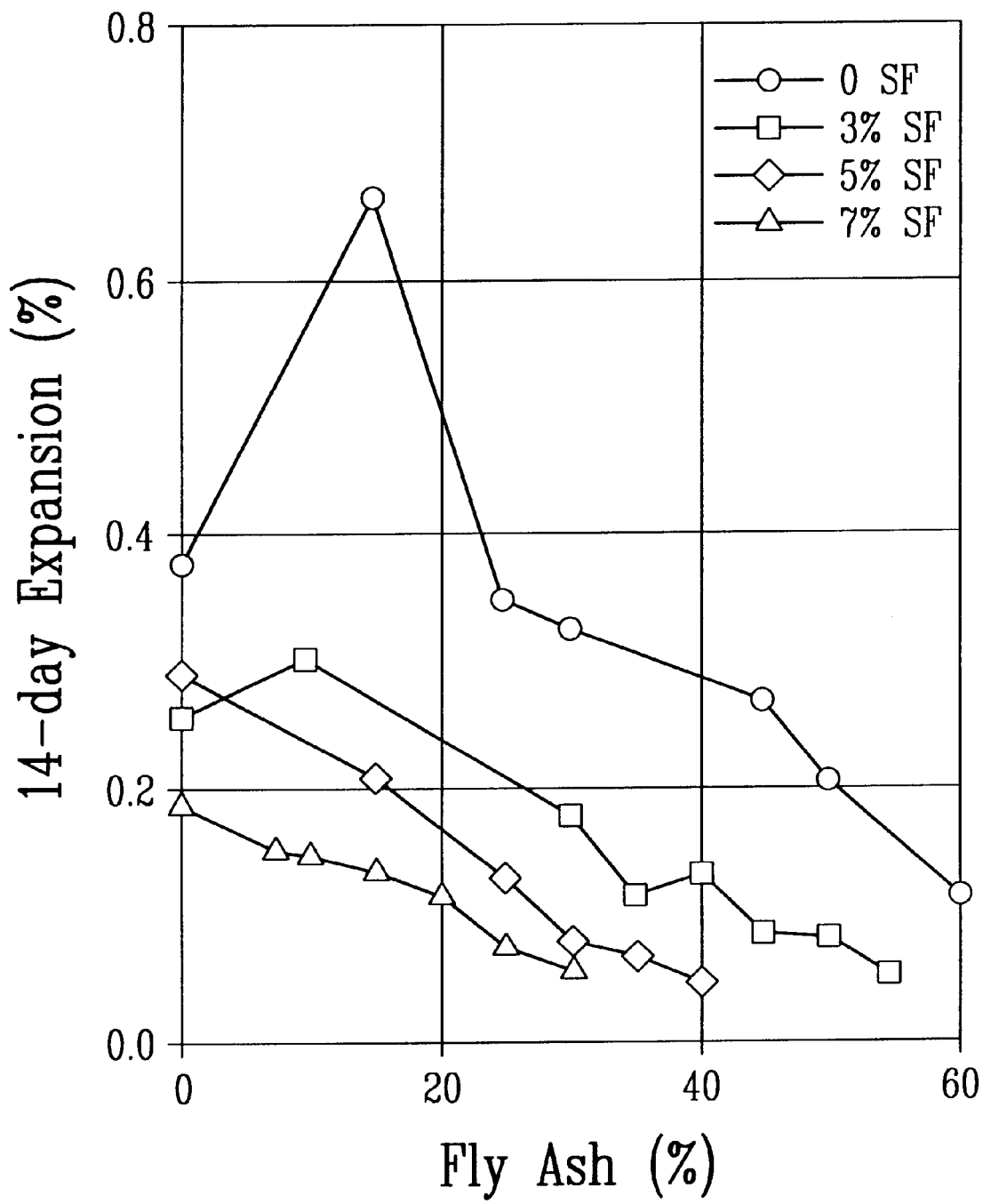
FIG. 2 is a plot similar to FIG. 1, for a second Class C fly ash.

The procedure of Example 1 was followed employing a Class C fly ash having an analytical content of CaO of 27.1%, by weight, obtained from the Oklaunion plant in Texas. The results are shown in FIG. 2 and are similar to those of Example 1, except that higher amounts of the Oklaunion Class C fly ash are required relative to the silica fume to achieve the desired low expansion.

More especially from FIG. 1 and FIG. 2 it can be seen that as the analytical content of CaO increases, the amount of Class C fly ash or silica fume or both, must be increased, in order to achieve a 14 day expansion by ASTM C 1260 below 0.1%.

Based on the results demonstrated in FIGS. 1 and 2, Table I below shows the minimum fly ash and total pozzolan content relative to silica fume content to satisfy ASTM C 1260.

TABLE I

Minimum Fly Ash and Total Pozzolan Content vs Silica Fume Content

| ASTM Class C Fly Ash | Silica Fume Content, % | Minimum Fly Ash Content, % | Total Pozzolan Content, % | % Fly Ash % Silica Fume |
|---|---|---|---|---|
| Edgewater | 3 | 22 | 25* | 88/12 |
| Edgewater | 5 | 15 | 20* | 75/25 |
| Edgewater | 7 | 10 | 17* | 59/41 |
| Oklaunion | 3 | 45 | 48 | 94/6 |
| Oklaunion | 5 | 28 | 33* | 85/15 |
| Oklaunion | 7 | 22 | 29* | 76/24 |

Minimums are based on a 0.1% max. expansion when tested according to ASTM C 1260.
*Note: 30% total pozzolan content is the upper limit permitted by most jurisdictions.

Table II below shows a range for Class C fly ash content for different amounts of silica fume to achieve an expansion of less than 0.1% by ASTM 1260, based on the afore-mentioned Edgewater and Oklaunion Class C fly ashes.

TABLE II

Range in Fly Ash Content vs Silica Fume Content

| Silica Fume | Range in Fly Ash |
|---|---|
| 3 | 22–45 |
| 5 | 15–28 |
| 7 | 10–22 |

Based on two Class C fly ashes with moderate to high CaO contents; total range 10% to 45%

Example 3

Cement compositions of the invention, a control and comparison compositions were formulated with Portland cement and different amounts of silica fume and a Class C fly ash or a Class F fly ash. These were mixed with mineral aggregate in accordance with the test procedure of ASTM C 1012. The Class C fly ash was obtained from Columbia boiler No. 2, Portage, Wis. The Class F fly ash was obtained from Fort Martin Allegeheny, W. Va.

Figure 3:
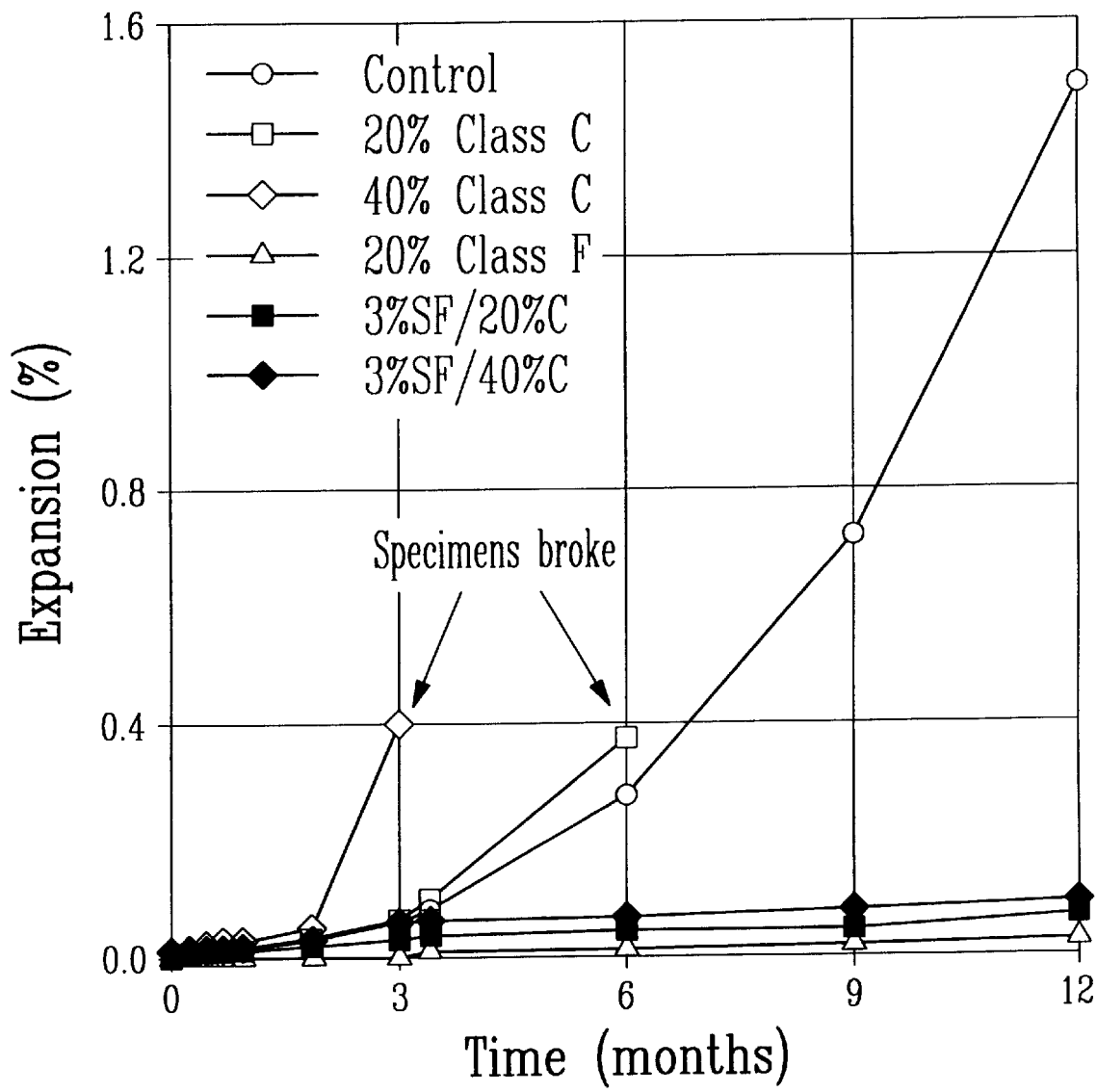
FIG. 3 is a plot illustrating sulphate resistance for mortar with different cement compositions.

The % expansion by ASTM C 1012 is set out in Table III below, and in FIG. 3 from which it can be seen that whereas 20%, by weight of Class F fly ash alone provided satisfactory results, use of 20% or 40%, by weight, of Class C fly ash alone was unsatisfactory. On the other hand, the addition of 3%, by weight, silica fume with the Class C fly ash produced satisfactory results comparable with those achieved employing Class F fly ash alone.

TABLE III

SO3 RESISTANCE ASTM C 1012

| Weeks | Months | Control | 20% Class C | 40% Class C | 20% Class F | 3%SF/20%C | 3%SF/40%C |
|---|---|---|---|---|---|---|---|
| 0 | 0 | 0.000 | 0.000 | 0.000 | 0.000 | 0.000 | 0.000 |
| 1 | 0.2307692 | 0.008 | 0.008 | 0.011 | 0.000 | 0.012 | 0.022 |
| 2 | 0.4615385 | 0.012 | 0.015 | 0.016 | 0.001 | 0.0015 | 0.027 |
| 3 | 0.6923077 | 0.020 | 0.019 | 0.020 | 0.002 | 0.021 | 0.034 |
| 4 | 0.9230769 | 0.024 | 0.022 | 0.023 | 0.002 | 0.020 | 0.035 |
| 8 | 1.8461538 | 0.040 | 0.033 | 0.054 | 0.004 | 0.022 | 0.040 |
| 13 | 3 | 0.061 | 0.060 | 0.396 | 0.008 | 0.034 | 0.056 |
| 15 | 3.4615385 | 0.088 | 0.100 | broke | 0.011 | 0.039 | 0.063 |
| 26 | 6 | 0.266 | 0.367 | — | 0.015 | 0.045 | 0.066 |
| 39 | 9 | 0.713 | broke | — | 0.022 | 0.046 | 0.077 |
| 52 | 12 | 1.490 | — | — | 0.024 | 0.068 | 0.090 |

We claim:

1. A cement composition for use with alkali-silica reactive aggregate to produce a concrete exhibiting acceptable low expansion or for increasing sulphate resistance of a concrete, comprising, in weight %, to a total of 100%:
   i) 45 to 87 of hydraulic cement;
   ii) 10 to 45% of a Class C fly ash having a calcium oxide analytical content greater than 15%, by weight, of said fly ash, and
   iii) 3 to 10% of silica fume.

2. A composition according to claim 1, comprising:
   15 to 35%, by weight, of said Class C fly ash, and
   3 to 7%, by weight, of said silica fume.

3. A composition according to claim 2, wherein said analytical content of calcium oxide in said Class C fly ash is greater than 20%, by weight.

4. A cementitious composition for use with alkali-silica reactive aggregate to produce a concrete exhibiting acceptable low expansion or for increasing sulphate resistance of a concrete comprising:
   a) a cement composition comprising in weight %, to a total of 100%
      i) 45 to 87 of a hydraulic cement,
      ii) 10 to 45% of a Class C fly ash having a calcium oxide analytical content greater than 15%, by weight of said fly ash, and
      iii) 3 to 10% of silica fume, and
   b) water.

5. A composition according to claim 4, comprising: 15 to 35%, by weight, of said Class C fly ash and 3 to 7%, by weight, of said silica fume, and said analytical content of calcium oxide in said Class C fly ash is greater than 20%, by weight.

6. A solidifiable concrete formulation comprising:
   A) alkali-silica reactive aggregate, and
   B) a cement binder in an amount to bind said aggregate in a solidifiable mass, said cement binder comprising:
      a) a cement composition comprising in weight % to a total of 100%:
         i) 45 to 87 of hydraulic cement;
         ii) 10 to 45% of a Class C fly ash having a calcium oxide analytical content greater than 15%, by weight, of said fly ash, and
         iii) 3 to 7% of silica fume, and
      b) water;
   said concrete formulation in a solidified state, exhibiting low expansion.

7. A formulation according to claim 6, which in a solidified state exhibits an expansion, by ASTM C 1260, of less than 0.1% at 14 days.

8. A formulation according to claim 7, wherein said cement composition comprises 15 to 35%, by weight, of said Class C fly ash and 3 to 7%, by weight, of said silica fume and said analytical content of calcium oxide in said Class C fly ash is greater than 20%, by weight.

9. A solidified concrete comprising:
   an alkali-silica reactive aggregate bound in a solid mass with a solidified binder derived from a cement binder comprising:
   a) a cement composition comprising in weight % to a total of 100%;
      i) 45 to 87 of hydraulic cement;
      ii) 10 to 45% of a Class C fly ash having a calcium oxide content greater than 15%, by weight, of said fly ash, and
      iii) 3 to 10% of silica fume, and
   b) water.

10. A concrete according to claim 9, wherein said cement composition comprises 15 to 35%, by weight, of said Class C fly ash and 3 to 7%, by weight, of said silica fume, and said analytical content of calcium oxide in said Class C fly ash is greater than 20%, by weight.

11. A concrete according to claim 9, wherein said solid mass exhibits an expansion, by ASTM C 1260, of less than 0.1% at 14 days.

12. A method of inhibiting expansion of a concrete derived from alkali-silica reactive aggregate comprising:
   binding said alkali-silica reactive aggregate in a solidifiable mass with a binder comprising:
   a) a cement composition comprising in weight % to a total of 100%;
      i) 45 to 87 of hydraulic cement;
      ii) 10 to 45% of a Class C fly ash having a calcium oxide content greater than 15%, by weight, of said fly ash, and iii) 3 to 10% of silica fume, and b) water.

13. A method according to claim 12, wherein said cement composition comprises: 15 to 35%, by weight, of said Class C fly ash and 3 to 7%, by weight, of said silica fume, and said analytical content of calcium oxide in said Class C fly ash is greater than 20%, by weight.

14. In a concrete formation comprising a mineral aggregate bound in a solid mass with a solidified binder, said concrete formation being disposed in an environment in which it is exposed to attack by sulphates, the improvement wherein said binder is derived from a cement binder comprising a) a cement composition comprising in weight % to a total of 100%
 i) 45 to 87 of hydraulic cement;
 ii) 10 to 45% of a Class C fly ash having a calcium oxide content greater than 15%, by weight, of said fly ash, and
 iii) 3 to 10% of silica fume, and b) water.

15. A method of rendering a concrete resistant to sulphate attack comprising:

forming a solidifiable concrete formulation comprising:

A) mineral aggregate, and

B) a cement binder in an amount to bind said aggregate in a solidifiable mass, said cement binder comprising:

a) a cement composition comprising in weight % to a total of 100%;
 i) 45 to 87 of hydraulic cement;
 ii) 10 to 45% of a Class C fly ash having a calcium oxide analytical content greater than 15%, by weight, of said fly ash, and
 iii) 3 to 10% of silica fume, and b) water;

solidifying said concrete formulation to a solidified state having a resistance to sulphate by ASTM C 1012, of less than 0.1% at 1 year.

16. A method according to claim 15, including exposing the solidified concrete to a sulphate-containing environment.

17. A method according to claim 16, wherein said environment is a sulphate-containing ground water.

* * * * *